June 4, 1963 W. W. MORGAN ETAL 3,092,446
SEPARATION OF PLUTONIUM FROM URANIUM
Filed Nov. 25, 1958

INVENTOR
William W. Morgan
Wilson G. Mathers
BY Robert C. Hart
Alex. E. MacRae
ATTORNEY

3,092,446
SEPARATION OF PLUTONIUM FROM URANIUM

William W. Morgan, Wilson G. Mathers, and Robert G. Hart, Deep River, Ontario, Canada, assignors to Atomic Energy of Canada Limited, Ottawa, Ontario, Canada, a company of Canada
Filed Nov. 25, 1958, Ser. No. 776,280
2 Claims. (Cl. 23—14.5)

This invention relates to the art of decontaminating uranium, and more specifically to the art of extracting plutonium from neutron irradiated uranium material, in a three column extraction system, with tributyl phosphate in a diluent as the extracting medium, in order to free the uranium from radio-activity and enable it to be used without danger of adverse effects of radio-activity.

Figure 1:
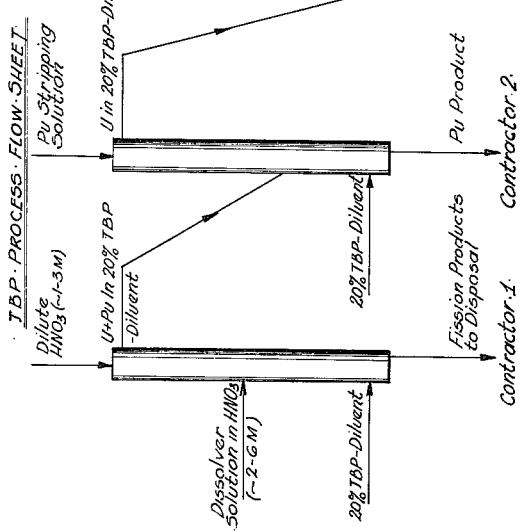

It is a known procedure to treat neutron irradiated material in the form of a nitrate solution in a three column system with tributyl phosphate in a diluent, as the extracting medium, in accordance with the flow sheet as illustrated in FIGURE 1 of the accompanying drawing which illustrates the general mode of introducing the three solutions which are brought into contact to effect the separation of fission products, plutonium and uranium. The significant feature of this procedure is the concurrent extraction of plutonium and uranium into the solvent extractant from the nitric acid medium, and in such manner that the bulk of the fission products remains in the aqueous phase, and the uranium and plutonium are recovered separately from the solvent.

Figure 3:
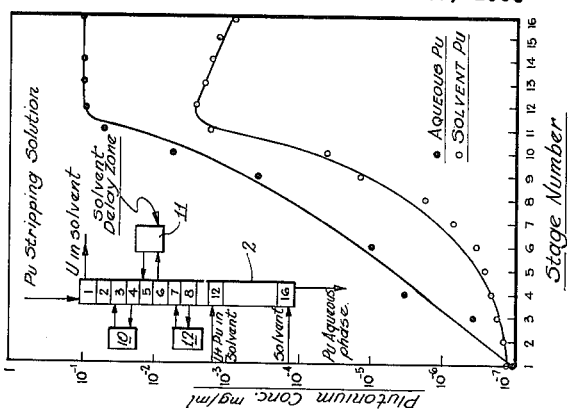
Figure 2:
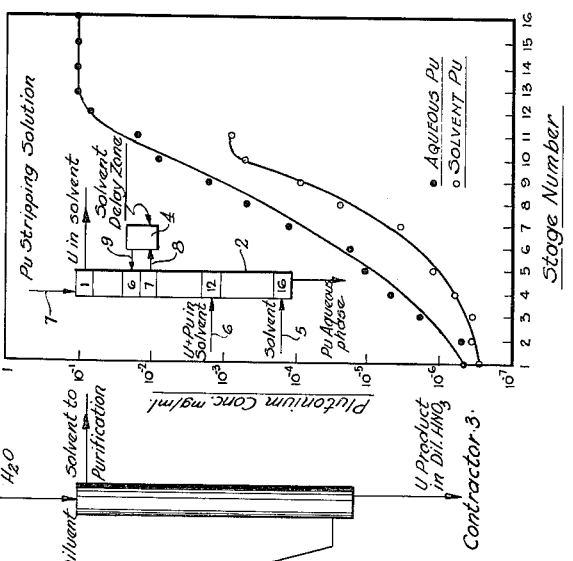

The present invention is particularly concerned with the operation of column 2 in the above noted system as illustrated in FIGURES 1, 2 and 3 of the accompanying drawing. The primary object of the invention is to provide a process whereby the plutonium may be effectively extracted in a single passage through column 2 and decontaminated uranium be released for recovery in column 3.

It is known in this art of using tributyl phosphate as an extracting solvent, that due to hydrolysis of tributyl phosphate as well as its radiation decomposition dibutyl phosphate complexes of uranium, plutonium and fission products are formed and that these factors make effective decontamination of uranium extremely difficult.

It has now been established that, in the use of tributyl phosphate in the extraction system here involved, (1) there is a reaction between plutonium dibutyl phosphate and uranium tributyl phosphate and that advantage can be taken of the kinetics of this reaction in the effective decontamination of uranium and (2) certain combinations of tributyl phosphate, the diluent and the plutonium stripping solution are essential in order to effectively remove the plutonium from the uranium.

It is thus a further object of this invention to provide a process whereby full advantage may be taken of the important factors just stated by insuring the maintenance in column 2 of stage-wise material balance in the solutions counter-currently flowing through the column.

In the operation of the process of the invention, the concentration of dibutyl phosphate in the solvent extractant phase determines the degree of separation of plutonium from the uranium. Accordingly when this concentration exceeds for example 0.001% by volume it is necessary to hold up or delay the flow of the solvent extractant phase for a period of time to permit the plutonium-dibutyl complex to be converted to the pluto- nium-tributyl-phosphate complex. The reaction taking place is shown by the following formula:

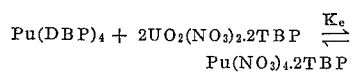

$$Pu(DBP)_4 + 2UO_2(NO_3)_2 \cdot 2TBP \overset{K_e}{\rightleftharpoons}$$
$$Pu(NO_3)_4 \cdot 2TBP + 2UO_2(DBP)_2 + 2TBP$$

It will now be apparent that when the solvent phase is reintroduced into the column to contact the plutonium stripping solution the plutonium-tributyl-phosphate complex formed in the hold-up is readily removed from the uranium-containing solvent. It is to be observed that the plutonium-tributyl-phosphate complex is readily removed from the solvent by the plutonium stripping solution, whereas the plutonium-dibutyl-phosphate complex is not.

On the other hand, if the dibutyl phosphate concentration is low, for example 0.0005% by volume an adequately decontaminated uranium product may be obtained by allowing sufficient contact time between the aqueous and solvent phases, without the use of solvent hold-up or delay stages.

In both these operations it is necessary to maintain a stage-wise material balance for plutonium. The stage-wise material balance for uranium is not a problem. Those skilled in this art will now recognize the importance of a stage-wise material balance in the system.

It is well known, in the operation of column 2 of this system, that ferrous ion ($Fe^{++}$) or hydroxylamine nitrate ($NH_2OH \cdot HNO_3$) are used to reduce plutonium from the plus four oxidation state to the plus three state, in which form it is readily extractable into the aqueous phase of the system.

It has now been found that when ferrous ion is used as the reducing agent, diluent, for the tributyl phosphate solvent, such as aliphatic hydrocarbons, for example that known under the trade name "Soltrol 170" may not be used, because a stage-wise material balance for plutonium is not attained. However the other diluents herein mentioned may be used. On the other hand, when hydroxylamine nitrate is used as the reducing agent, any of the usual diluents, such as "Soltrol," xylene, toluene, decalin and the like may be used in achieving the required stage-wise material balance for plutonium.

The process of the invention is further illustrated by reference to the accompanying drawings in which, FIGURE 1 shows the typical, known tributyl phosphate flow sheet, the columns or contactors being 1, 2 and 3 and typical flow streams are shown.

FIGURE 2 shows operation of column 2 in accordance with the preferred process of the invention and the flowing solutions are identified. The zone 4 represents the hold-up or delay in the flow of the solvent. As illustrated by the arrows 5 and 6 the solvent moves counter-currently in continuous contact with the plutonium stripping stream 7. At a selected point the solvent is removed from the column into the hold-up zone to provide the desired delay time and then returned to the column as indicated by the arrows 8 and 9. The two curves in the drawing show the distribution of plutonium in the aqueous and solvent stages at all points in the operating column. For clarity of understanding the successive contact zones in column 2 are marked and numbered.

FIGURE 3 of the drawing is included to show the effect of a plurality of solvent delay zones 10, 11 and 12. The operation is otherwise the same as that described in relation to FIGURE 2.

The following table illustrates the comparative results of the operation as above described.

| Run No. | Solvent | Flow ratios, feed/aq. strip/solv. scrub | Stripping Solution | Mixer Holdup Time (mins.) | U/Pu by wt. exit solv. |
|---|---|---|---|---|---|
| 1 | 20% TBP-Soltrol | 1/0.25/0.25 | 0.02 M $Fe^{++}$ | 0.5 | $0.007 \times 10^8$ |
| 2 | 20% TBP-Toluene | 1/0.25/0.25 | 0.02 M $Fe^{++}$ | 0.5 | $0.03 \times 10^8$ |
| 3 | 20% TBP Soltrol | 1/0.28/0.5 | 0.1 M $NH_2OH \cdot HNO_3$ | 3.5 | $0.5 \times 10^8$ |
| 4 | 20% TBP-Xylene | 1/0.25/0.25 | 0.02 M $Fe^{++}$ | 1.9 | $0.5 \times 10^8$ |
| 5 | do | 1/0.28/0.5 | 0.1 M $NH_2OH \cdot HNO_3$ | 3.5 | $0.34 \times 10^8$ |
| 6 | do | 1/0.25/0.25 | 0.02 M $Fe^{++}$ | 1.9 | $1.5 \times 10^8$ |
| 7 | do | 1/0.28/0.5 | 0.1 M $NH_2OH \cdot HNO_3$ | 3.5 | $3.9 \times 10^8$ |

With the exception of run No. 1 a stage-wise material balance for plutonium was attained in all of the operations. In run No. 5 a solvent hold-up or delay period of 3.5 minutes was provided between stages 6 and 7 as shown in FIGURE 2. In run No. 7 a solvent hold-up or delay period of 3.5 minutes was provided between stages 3 and 4, 5 and 6 and 7 and 8 as shown in FIGURE 3 of the drawing. The uranium to plutonium weight ratio in the exit solvent or uranium product phase shows the extent to which the plutonium has been removed from the uranium, and thus the uranium decontaminated, under the conditions indicated in each run.

From the above disclosure those skilled in the art will be able to readily operate column 2 in the three column system to obtain a uranium product substantially free from plutonium.

What is claimed is:

1. In the process of treating an aqueous nitric acid dissolver solution containing uranium, plutonium, and fission products by extracting the uranium and plutonium into a tributyl phosphate-diluent organic phase contaminated with dibutyl phosphate, stripping the plutonium from the organic phase by an aqueous nitric acid solution containing a reducing agent for $Pu^{+4}$, and then recovering the uranium from the organic phase in a plutonium stripping solution, the steps comprising passing the tributyl phosphate-diluent organic phase containing uranium, tetravalent plutonium and dibutyl phosphate, the dibutyl phosphate concentration being not substantially more than 0.001% by volume, in counter-current flow with the aqueous plutonium stripping solution, maintaining this counter-current flow until the plutonium-dibutyl phosphate complex is substantially all converted to the plutonium-tributyl phosphate complex and until the plutonium is substantially all stripped from the organic phase; at least one of the following being used (a) an aromatic diluent (b) hydroxylamine nitrate reducing agent.

2. In the process of treating, in a column, an aqueous nitric acid dissolver solution containing uranium, plutonium, and fission products by extracting the uranium and plutonium into a tributyl phosphate-diluent organic phase contaminated with dibutyl phosphate, stripping the plutonium from the organic phase by an aqueous nitric acid solution containing a reducing agent for $Pu^{+4}$, and then recovering the uranium from the organic phase in a plutonium stripping solution wherein the organic solvent and the aqueous stripping solution are in counter-current flow the steps comprising (a) introducing the tributyl phosphate-dibutyl phosphate-diluent phase containing uranium and tetravalent plutonium into said column, (b) downstream from the point of introduction withdrawing organic phase containing plutonium-tributyl phosphate complex and plutonium-dibutyl phosphate complex, (c) retaining this withdrawn portion out of contact with the main aqueous stream until the plutonium-dibutyl phosphate complex is substantially all converted to plutonium-tributyl phosphate complex, (d) returning said withdrawn portion to the column downstream from its removal point and stripping substantially all of the plutonium from the organic phase; at least one of the following being used (a) an aromatic diluent (b) hydroxylamine nitrate reducing agent.

References Cited in the file of this patent

UNITED STATES PATENTS

| | | |
|---|---|---|
| 2,850,362 | Scheibel | Sept. 2, 1958 |
| 2,852,349 | Hicks et al. | Sept. 16, 1958 |
| 2,859,092 | Bailes et al. | Nov. 4, 1958 |
| 2,860,031 | Grinstead | Nov. 11, 1958 |
| 2,864,664 | Spence et al. | Dec. 16, 1958 |
| 2,864,668 | Baldwin et al. | Dec. 16, 1958 |
| 2,908,547 | Nicholls et al. | Oct. 13, 1959 |

OTHER REFERENCES

Proceedings of the International Conference on the Peaceful Uses of Atomic Energy, Aug. 8–20, 1955, vol. 9, pp. 464–483, 492–497, 528–531, United Nations, New York.

Irish et al.: HW–494 83A, April 8, 1957, 33 p.

TID–7534, May 20–25, 1957, p. 83–106.

Bruce: "Process Chemistry," vol. 2, pp. 314, 315, 326–331, particularly pp. 327 to 330 which refer to work reported by: Rigg, T. (1957a), U.K.A.E.A. Report No. 1GR–R/W.203; Rigg, T. (1957b), U.K.A.E.A. Report No. 1GR–R/W.233; Rydberg (1955a), Svensk Kem Tidskr. 67, 499; Rydberg (1955b), Acta Chem. Scand. 9, 1252. Published by Pergamon Press, Ltd., New York City, 1958.